United States Patent
Sans Ravellat et al.

(10) Patent No.: US 12,030,141 B2
(45) Date of Patent: Jul. 9, 2024

(54) DEVICE AND PROCESS FOR THE LASER TREATMENT OF TROUSERS, COMPRISING TWO MANNEQUINS

(71) Applicant: JEANOLOGIA, S. L., Valencia (ES)

(72) Inventors: Ramón Sans Ravellat, Sant Quirze del Vallès (ES); Albert Sans Perarnau, Sant Quirze del Vallès (ES)

(73) Assignee: JEANOLOGIA, S. L., Paterna (ES)

( * ) Notice: Subject to any disclaimer, the term of this patent is extended or adjusted under 35 U.S.C. 154(b) by 483 days.

(21) Appl. No.: 17/244,005

(22) Filed: Apr. 29, 2021

(65) Prior Publication Data
US 2021/0346994 A1  Nov. 11, 2021

(30) Foreign Application Priority Data
May 8, 2020  (EP) .................................. 20382384

(51) Int. Cl.
| | |
|---|---|
| *B23K 37/04* | (2006.01) |
| *A41H 43/00* | (2006.01) |
| *B23K 15/00* | (2006.01) |
| *B23K 26/08* | (2014.01) |
| *B23K 26/352* | (2014.01) |
| *D06C 29/00* | (2006.01) |
| *A41D 1/06* | (2006.01) |

(52) U.S. Cl.
CPC .......... *B23K 37/0452* (2013.01); *A41H 43/00* (2013.01); *B23K 15/0033* (2013.01); *B23K 26/0823* (2013.01); *B23K 26/352* (2015.10); *D06C 29/00* (2013.01); *A41D 1/06* (2013.01)

(58) Field of Classification Search
CPC ...... D06C 29/00; D06C 5/005; B23K 26/352; B23K 37/0452; B23K 26/355; B23K 26/0823; B23K 37/0443; B23K 15/0033; B23K 26/702; B23K 26/082; B23K 26/0604; B23K 2103/38; D06B 11/0096; A41H 43/00; D06P 5/2005; D06M 10/005; A41D 1/06
See application file for complete search history.

(56) References Cited

FOREIGN PATENT DOCUMENTS

| | | |
|---|---|---|
| ES | 2649745 A1 | 1/2018 |
| JP | S60177986 A | 9/1985 |
| JP | 6422182 B2 | 11/2018 |
| WO | 03/029545 A1 | 4/2003 |

(Continued)

OTHER PUBLICATIONS

European Search Report issued on Oct. 16, 2020 in corresponding application No. 20382384.4; 7 pgs.

*Primary Examiner* — Dana Ross
*Assistant Examiner* — Kuangyue Chen
(74) *Attorney, Agent, or Firm* — Maier & Maier, PLLC

(57) ABSTRACT

A device for the laser treatment of trousers, including a laser beam generating equipment suitable for emitting the laser beam in any direction within an emission pyramid with an emission axis and two opening angles, and a work station with two mannequins, where each mannequin includes two legs. Each leg defines a longitudinal axis, and the two longitudinal axes of each mannequin define a mannequin plane. Each of the mannequins is oriented towards the equipment so that the emission axis strikes the mannequin plane at an angle of less than 90° and each mannequin has at least one of its legs within the pyramid.

12 Claims, 7 Drawing Sheets

(56) References Cited

FOREIGN PATENT DOCUMENTS

| WO | 2017/191347 | A1 | | 11/2017 | | |
|----|-------------|----|----|---------|---|---|
| WO | 2018/011447 | A1 | | 1/2018 | | |
| WO | WO-2018011447 | A1 | * | 1/2018 | ............. | B23K 26/08 |

\* cited by examiner

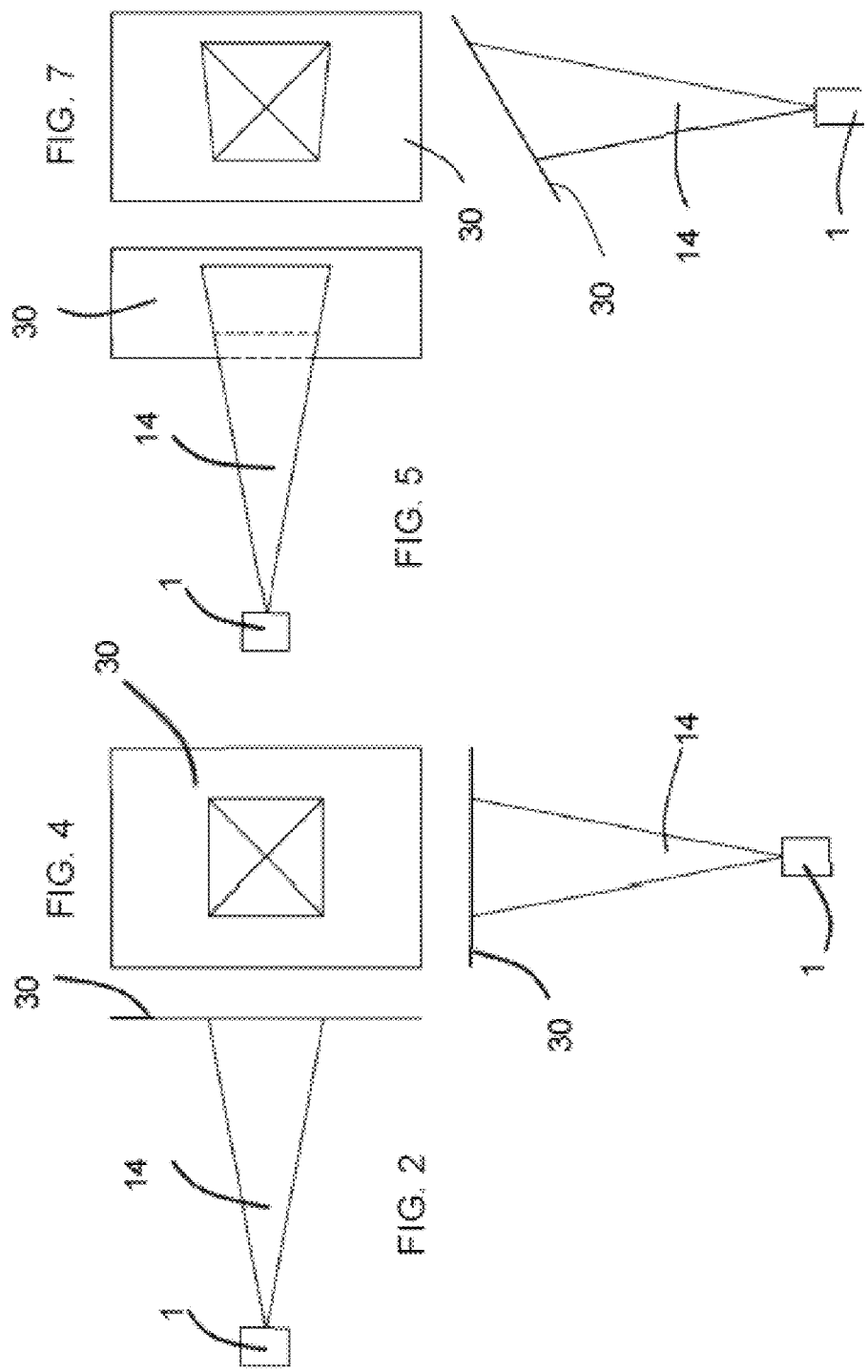

DEVICE AND PROCESS FOR THE LASER TREATMENT OF TROUSERS, COMPRISING TWO MANNEQUINS

FIELD

The invention relates to a device for the laser treatment of trousers, comprising [a] a laser beam generating equipment, and [b] a work station with two mannequins. The invention also relates to laser treatment processes for trousers using a device according to the invention.

BACKGROUND

Devices for laser treating fabrics, in particular trousers, are known. In certain cases, the trousers are arranged on a horizontal flat surface (a board or the like). In other cases, the trousers are arranged on a mannequin such that, during the laser treatment process, the trousers are in an upright position. Examples of these mannequin devices are disclosed in patent documents WO 03/029545 A1 and ES 2 649 745 A1.

Patent document WO 2018/011447 describes a device for the laser treatment of trousers, which comprises a generator device for generating a beam of light, a head and rotation means for rotating the head according to a vertical axis, wherein the head comprises an inlet defining an inlet axis and suitable for receiving the beam, an outlet defining an outlet axis, and internal mirrors. WO 2018/011447 describes that for the purpose of treating trousers disposed on a plurality of trouser rails, the head is rotated and therefore is moved for pointing the laser beam to one trouser or another.

In some cases, the mannequins extend the trousers so that they become substantially flat, but in other cases the mannequins have means that allow the trousers to be given a three-dimensional shape, for example by means of inflatable balloons (see also WO 2017/191347). Both solutions have their advantages and disadvantages.

Generally, it is still necessary to find solutions that allow high productivity with reduced amount of labor, economic mechanical solutions and, at the same time, high precision while allowing high-quality treatment of all the points of the surface of the trousers.

SUMMARY

The object of the invention is a new device for the laser treatment of trousers, comprising [a] a laser beam generating equipment, wherein the equipment defines an emission axis, a first opening angle around the emission axis and a second opening angle around the emission axis, in a plane perpendicular to the first opening angle, such that the equipment is suitable for emitting the laser beam in any direction comprised within a pyramid defined by the emission axis and the first and second opening angles (emission pyramid), and [b] a work station with two mannequins, wherein each mannequin comprises an upper support structure, with a fixing area for the upper part of a pair of trousers, and from which two legs, suitable to be housed inside the trouser legs of said pair of trousers, extend, wherein each leg defines a longitudinal axis, wherein the two longitudinal axes of the two legs of each mannequin define a mannequin plane, wherein each mannequin defines a longitudinal symmetry axis arranged in the mannequin plane, wherein each one of the mannequins is oriented towards the equipment so that the emission axis strikes the mannequin plane at an angle of less than 90° (wherein this angle is defined as the angle formed between the emission axis and the geometric orthogonal projection of the emission axis on the mannequin plane) and each mannequin has at least one of its legs within the pyramid.

Generally, in the present invention it is to be understood that the laser beam generating equipment comprises a laser beam generating unit as such from which a laser beam comes out and a head where the laser beam from the generating unit enters through an input and exits through an output. The head has internal mirrors (usually two, called galvanometric mirrors) in which the incoming laser beam from the input is reflected to exit through the output. The movement of this mirror or mirrors is what defines the first opening angle and the second opening angle. Also, the mirror (or mirrors) in its neutral position defines the emission axis, which is the direction of the laser beam exiting the head when the mirror (or mirrors) is in its neutral position. The intersection point of the emission axis with the mirror or with the last of the mirrors (if there is more than one), that is, with the mirror closest to the head output, defines the origin of the emission axis. In the present invention, the head as a whole does not move with respect to the laser beam generating unit, that is, the head as a whole is fixed with respect to the laser beam generating unit. In other words, the head, as a whole, cannot rotate on itself nor can it move with respect to the generating unit. It is, therefore, different from the device disclosed in patent document ES 2 649 745 A1. In this sense, it should be understood that the head does not move or rotate to direct its outgoing laser beam from one mannequin to another, although it is possible that it can move or rotate with respect to the laser generating unit to align itself correctly, to focus the laser beam or for similar purposes.

Indeed, the device according to the invention is suitable for treating two pairs of trousers arranged on two mannequins without the need to move the mannequins (as described in, for example, patent document WO 03/029545 A1) and without the need to rotate the device or head (as described in, for example, patent document ES 2 649 745 A1). The device according to the invention is suitable for treating the entire surface of the trousers on both mannequins only by means of the movement of the mirror or galvanometric mirrors housed inside the head. In addition, with the orientation given to the mannequins with respect to the emission axis, the drawbacks derived from the use of mannequins that allow the trousers to be given a three-dimensional shape (for example, by inflatable balloons), such as shading or very oblique angles of incidence, are reduced.

In a preferred embodiment of the device according to the invention, the two legs of the two mannequins are within said pyramid. In this case, a single laser beam generating equipment (and, consequently, a single laser beam generating unit and a single head) is sufficient. It should only be ensured that both trousers are within the pyramid defined by the emission axis and the first and second opening angles.

Alternatively, in another preferred embodiment of the device according to the invention, the device additionally comprises a second laser beam generating equipment, wherein the second equipment defines a second emission axis, a third opening angle around the second emission axis and a fourth opening angle around the second emission axis, in a plane perpendicular to the third opening angle, such that the second equipment is suitable for emitting the laser beam in any direction comprised within a second pyramid defined by the second emission axis and the third and fourth opening angles (second emission pyramid), wherein each one of the mannequins is oriented towards the second equipment so that the second emission axis strikes the mannequin plane at an angle of less than 90° (wherein this angle is defined as the angle formed between the second emission axis and the geometric orthogonal projection of the second axis emission on the mannequin plane) and each mannequin has at least one of its legs within the second pyramid, so that any leg of any mannequin is within at least one of the pyramid and second pyramid. This solution is, therefore, a device with two generating equipments that has additional advantages. Thus, since the set of the two pairs of trousers does not have to fit within each of the pyramids, it is possible to reduce the distance between the generating equipments and the trousers, reducing the difference in focal length between both generating equipments with respect to the mannequins.

In the case of a device with two laser beam generating equipments, preferably only three of the mannequin legs are within each of the pyramid and the second pyramid. Indeed, as will be seen in more detail later, this solution allows implementation of a novel process, whereby each generating equipment treats one of the trouser legs, on one of its sides, for each pair of trousers and the other generating equipment treats the other two trouser legs, also on one of its sides. Subsequently, the mannequins rotate 180° around its longitudinal symmetry axis and again each generating equipment treats one of the trouser legs, for the side not yet treated, for each pair of trousers and the other generating equipment treats the other two trouser legs, also for the still untreated side. Alternatively, or additionally, it is advantageous that the two mannequin planes are arranged in such a way that their perpendicular directions passing through their respective longitudinal symmetry axis intersect at the midpoint between the vertices of the pyramid and the second pyramid. On the other hand, it is possible that the emission axis and the second emission axis are not parallel to each other, but preferably both are parallel to each other.

Preferably, the emission axis strikes the mannequin plane of each one of the mannequins at an angle of between 65° and 85° and, in the case of two generating equipments, preferably the second emission axis strikes the mannequin plane of each one of said mannequins at an angle of between 65° and 85°.

Advantageously, the emission axis and the second emission axis are at the same height. Generally, preferably, the mannequins are in a vertical position.

Advantageously, the emission axis and the second emission axis are separated from each other, at their origins, a distance of between 25 mm and 1000 mm, preferably of between 50 mm and 750 mm.

The invention also relates to a process for laser treating trousers using a device according to the invention, specifically with two generating equipments, characterized in that one of the two equipments treats the trouser legs of the trousers arranged on the mannequins which, from the standpoint of the equipment, are on the right side, and the other equipment treats the trouser legs of the trousers arranged on the mannequins which, from the standpoint of the equipment, are on the left side. As will be seen later, in the examples, this process makes it possible to take advantage of the geometry of the device in a particularly advantageous way.

Another object of the invention is a laser treatment process for trousers using a device according to the invention, specifically with two generating equipments, characterized in that each of the trouser legs of the trousers is treated on one of its sides by one of the equipments and on the other of its sides by the other equipment. Preferably this process comprises a step in which the equipment treats the front part of the first trouser leg of each trouser and the second equipment treats the front part of the second trouser leg of each trouser, then the trouser is rotated 180° around its longitudinal symmetry axis (that is, the mannequin that is supporting the trouser is turned) and then the equipment treats the back part of the second trouser leg of each trouser and the second equipment treats the back part of the first trouser leg of each of trouser. Alternatively, in another preferred solution, the process comprises a step in which the equipment treats the back part of the first trouser leg of each trouser and the second equipment treats the back part of the second trouser leg of each trouser, then the trouser is rotated 180° around of its longitudinal symmetry axis (that is, the mannequin that is supporting the trouser is rotated) and then the equipment treats the front part of the second trouser leg of each trouser and the second equipment treats the front part of the first trouser leg of each trouser.

A particularly advantageous process combines the two processes outlined above.

BRIEF DESCRIPTION OF THE DRAWINGS

Further advantages and features of the invention are appreciated from the following description, in which, without limitation, preferred embodiments of the invention are described, with reference to the accompanying drawings. The figures show:

FIG. 2, a side elevation view of the generating equipment of FIG. 1 projecting its pyramid (emission pyramid) on a flat surface perpendicular to the emission axis.

FIG. 3, a top plan view of the generating equipment and surface of FIG. 3.

FIG. 4, a view of the surface of FIG. 2 with the intersection with the emission pyramid.

FIG. 5, a side elevation view of the generating equipment of FIG. 1 projecting its pyramid (emission pyramid) on a flat surface at an oblique angle with the emission axis.

FIG. 6, a top plan view of the generating equipment and surface of FIG. 5.

FIG. 7, a view of the surface of FIG. 5 with the intersection with the emission pyramid.

DETAILED DESCRIPTION OF EMBODIMENTS

Figure 1:
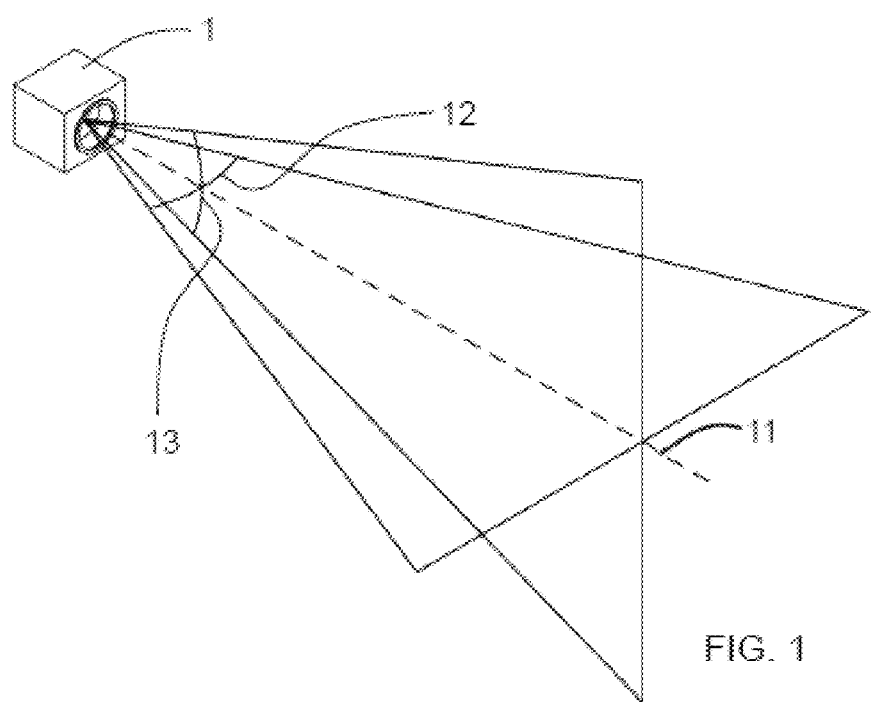
FIG. 1, a schematic perspective view of a laser beam generating equipment.

In FIG. 1 a laser beam generating equipment 1 is shown, represented very schematically. The equipment 1 defines an emission axis 11, with a first opening angle 12 around the emission axis 11, and a second opening angle 13 also around the emission axis 11 and in a plane perpendicular to the first opening angle 12. Usually (and preferably, but not necessarily) the first opening angle 12 is horizontal and the second opening angle 13 is vertical. The two opening angles 12 and 13, together with the emission axis 11 define the emission pyramid 14 of the equipment 1.

It is to be understood that the equipment 1 is actually a more complex set, including not only a laser beam generating unit but also all corresponding optical, electrical, and mechanical systems. In particular, it includes a head with galvanometric mirrors with their movement, control, refrigeration systems, etc., as they are known to a person skilled in the art. What is important is that, for the present invention, this head is fixed with respect to the laser beam generating unit in the sense that it is not suitable for directing its emission pyramid from one mannequin to another. Since as described further above, the head can move or rotate with respect to the laser generating unit to align itself correctly, to focus the laser beam or for similar purposes, it can be understood that the head is not necessarily permanently fixed with respect to the laser beam generating unit, but instead, the head may be fixable, e.g. temporarily fixed, with respect to the laser beam generating unit. Likewise, from the above it can be understood that when/while the head is fixed so that the pyramid as a whole is fixed, i.e. so that the emission axis is fixed, obviously the laser beam that is moved (by the head) within the pyramid may move from one mannequin to another, provided that each mannequin has at least one of its legs within the fixed pyramid.

In FIGS. 2 and 3 an equipment 1 like the one in FIG. 1 is shown pointing its emission axis 11 on a flat surface, such as, for example, a mannequin plane 30. FIG. 4 shows the intersection between the emission pyramid 14 of the equipment 1 of FIGS. 2 and 3 with the mannequin plane 30. In the case shown in these Figs. the angle formed by the emission axis 11 and the mannequin plane 30 is of 90°. However, in FIGS. 5 to 7 the same is shown, but in the case in which the emission axis 11 forms an oblique angle with the mannequin plane 30. As can be seen, in the case of a device with a single equipment 1 and a single mannequin, it is advantageous for the mannequin plane 30 to be perpendicular to the emission axis 11 of the equipment 1, since a greater homogeneity and, therefore, greater precision and quality in the treatment is achieved. However, as will be seen below, in the case of a device with two mannequins it may be interesting that this is not the case.

Figure 8:
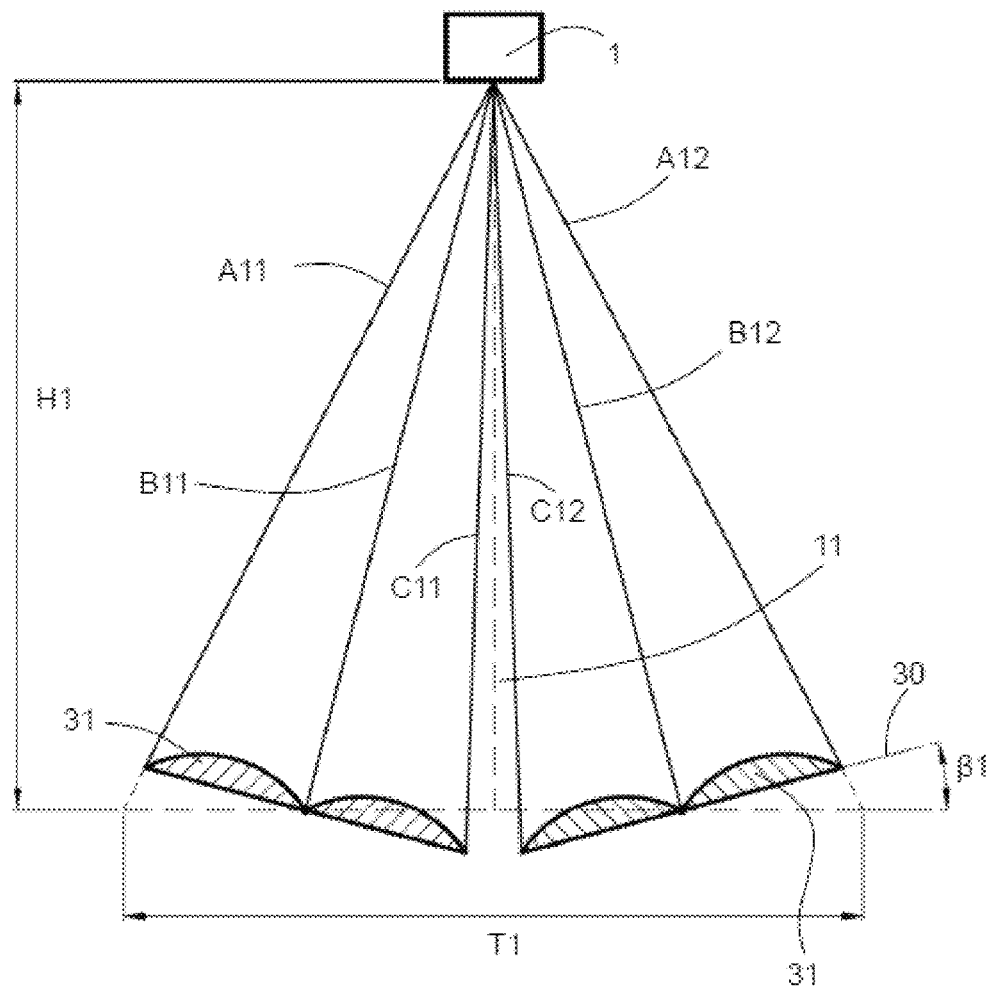
FIG. 8, a schematic top plan view of a first embodiment of a device according to the invention.
Figure 9:
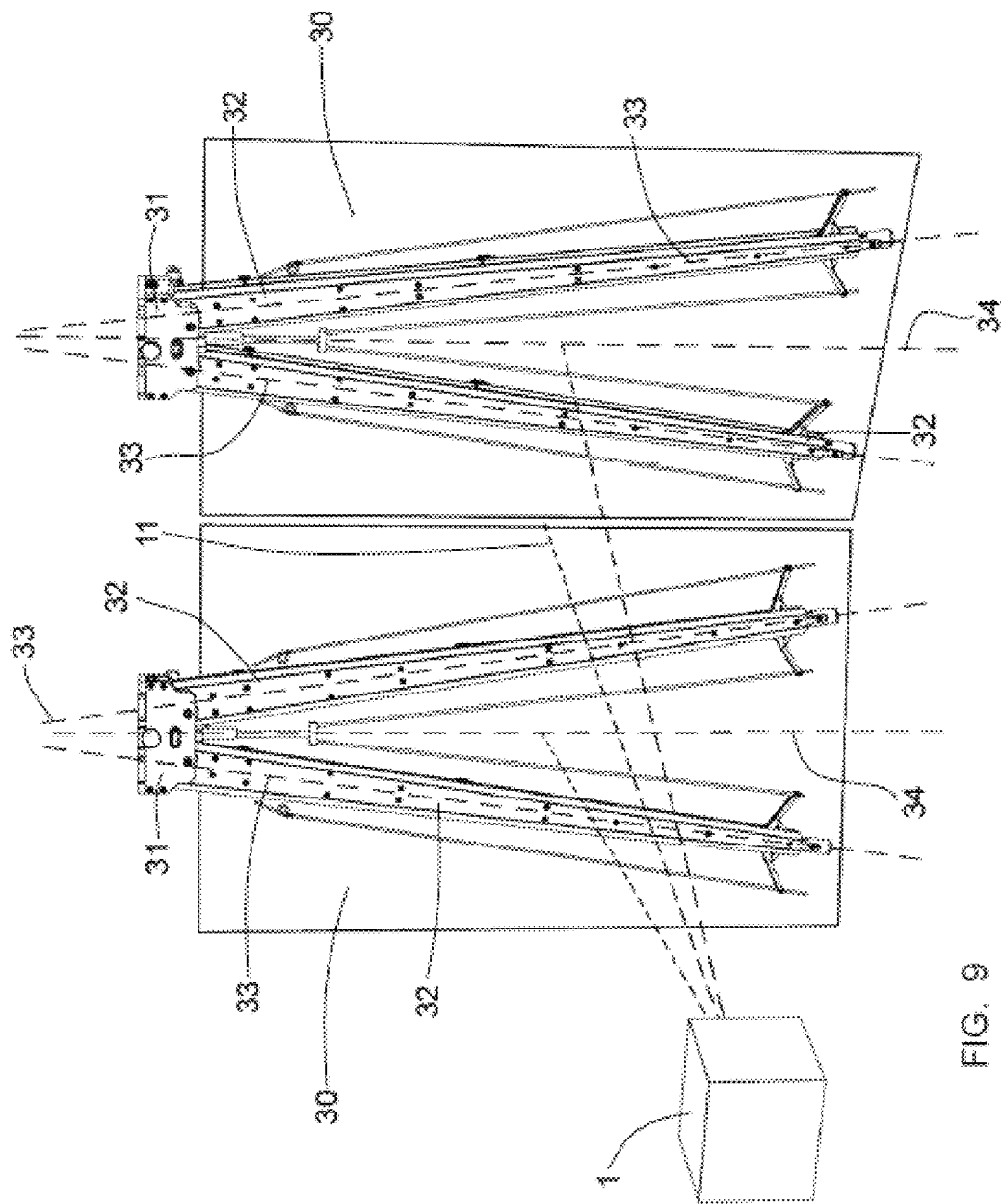
FIG. 9, a schematic perspective view of the device of FIG. 8.

FIGS. 8 and 9 show a first embodiment of a laser treatment device for trousers according to the invention. The device comprises a laser beam generating equipment 1 defining an emission axis 11, a first opening angle 12 around the emission axis 11, which is the angle between lines A11 and A12, and a second opening angle 13 around the emission axis 11, in a plane perpendicular to the first opening angle 12, that is, perpendicular to the reader's sheet of paper (or screen) in FIG. 8.

The device also comprises a work station with two mannequins 31. The mannequins 31 may be conventional. Each mannequin 31 preferably comprises an upper support structure, with a fixing area for fixing the upper part of a pair of trousers, and from which two legs 32, suitable to be housed within the trouser legs of said pair of trousers, extend, wherein each leg 32 defines a longitudinal axis 33, wherein the two longitudinal axes 33 of the two legs 32 of each mannequin define a mannequin plane 30, wherein each mannequin 31 defines a longitudinal symmetry axis 34 arranged on the mannequin plane 30.

Each one of the mannequins 31 is oriented towards the equipment 1 so that the emission axis 11 strikes the mannequin plane 30 at an angle $\alpha 1$ of less than 90°. In FIG. 8 the angle $\beta 1$ has been represented, which is equal to $90°-\alpha 1$. In this embodiment, the two mannequins 31 have the two legs 32 within the pyramid 14 of the equipment 1.

As an example, the following values may be given:
A11=A12=2100 mm
B11=B12=2075 mm
C11=C12=2130 mm
H1=1970 mm
T1=1705 mm
$\beta 1=14.82°$ ($=90°-\alpha 1$)

Figure 10:
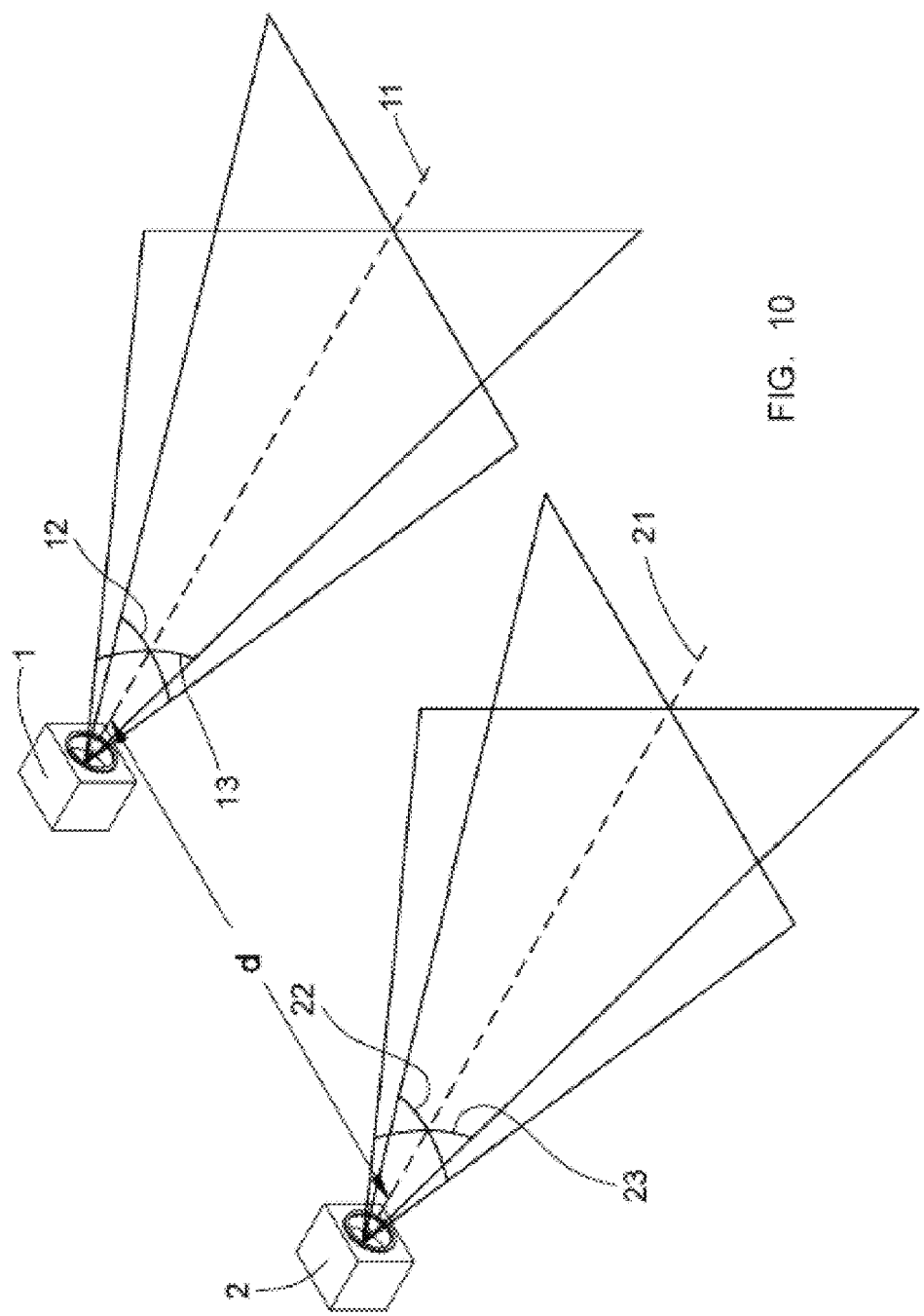
FIG. 10, a schematic perspective view of two laser beam generating equipments separated by a distance d.
Figure 11:
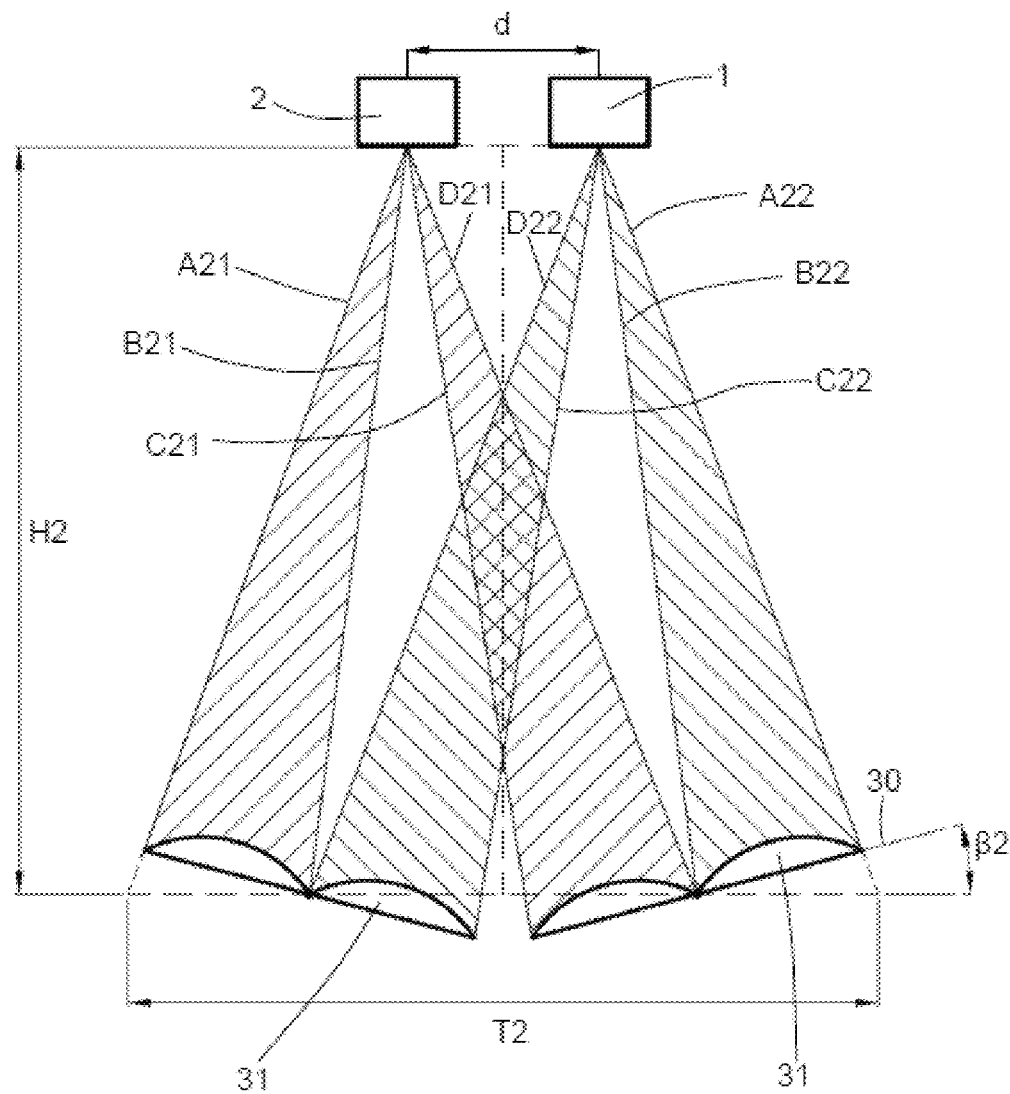
FIG. 11, a schematic top plan view of a second embodiment of a device according to the invention.

FIG. 10 shows a pair of two laser beam generating equipments 1 and 2, schematically represented. The first generating equipment defines the elements already described in FIG. 1. For its part, the second generating equipment 2 defines a second emission axis 21, with a third opening angle 22 around the second emission axis 21, and a fourth opening angle 23 also around the second emission axis 21 and in a plane perpendicular to the third opening angle 22. Usually (and preferably, but not necessarily) the third opening angle 22 is horizontal and the fourth opening angle 23 is vertical. The two opening angles 22 and 23, together with the second emission axis 21 define the second emission pyramid of the second equipment 2. Furthermore, the two equipments 1 and 2 are separated from each other by a distance d. This distance d is generally defined as the distance between the origins of the two emission axes 11 and 21, although in this embodiment the two emission axes 11 and 21 are parallel to each other, hence the distance d is constant. Each of the mannequins 31 is oriented towards the equipments 1 and 2 so that the respective emission axes 11 and 21 strike each of the mannequin planes 30 at an angle $\alpha 2$ of less than 90°. In FIG. 11 the angle $\beta 2$ has been represented, which is equal to $90°-\alpha 2$. Generally, preferably the two mannequins are oriented so that the angle $\beta 2$ of each of them is the same, as shown in FIG. 11.

Additionally, the emission axis 11 and the second emission axis 21 are at the same height. Generally, and preferably, the emission axes 11 and 21 are horizontal and, therefore, the height is measured vertically, from the ground.

FIG. 11 shows a second embodiment of a laser treatment device for trousers according to the invention. In this case, the device comprises a pair of generating equipments 1 and 2, such as those in FIG. 10. The first opening angle 12 is between lines A22 and D22 and the third opening angle 22 is between lines A21 and D21. Analogously to what happens in FIG. 8, the second opening angle 13 and the fourth opening angle 23 are perpendicular to the reader's sheet of paper (or screen). This second embodiment also includes a particularly advantageous alternative: only three of the legs 32 of the two mannequins 31 are within each of the pyramids. This allows the processes according to the invention to be carried out with this device, which makes it possible to optimize the distances between the generating equipments 1 and 2 and the mannequins, the laser beam incidence angles on the mannequins, minimize shading areas, etc. Additionally, it is possible to minimize the overall dimensions of the entire device, as can be seen from the numerical values of the following embodiment example:
A21=A22=1780 mm
B21=B22=1736 mm
C21=C22=1820 mm
D21=D22=1802 mm
H2=1650 mm
T2=1705 mm
d=280 mm
$\beta 2=14.82°$ ($=90°-\alpha 2$)

As can be seen, for a value of T2 equal to T1 (which is given by the width of the mannequins 31), it is achieved that H2 is significantly smaller than H1, with the consequent reduction of all other distances.

Figure 12:
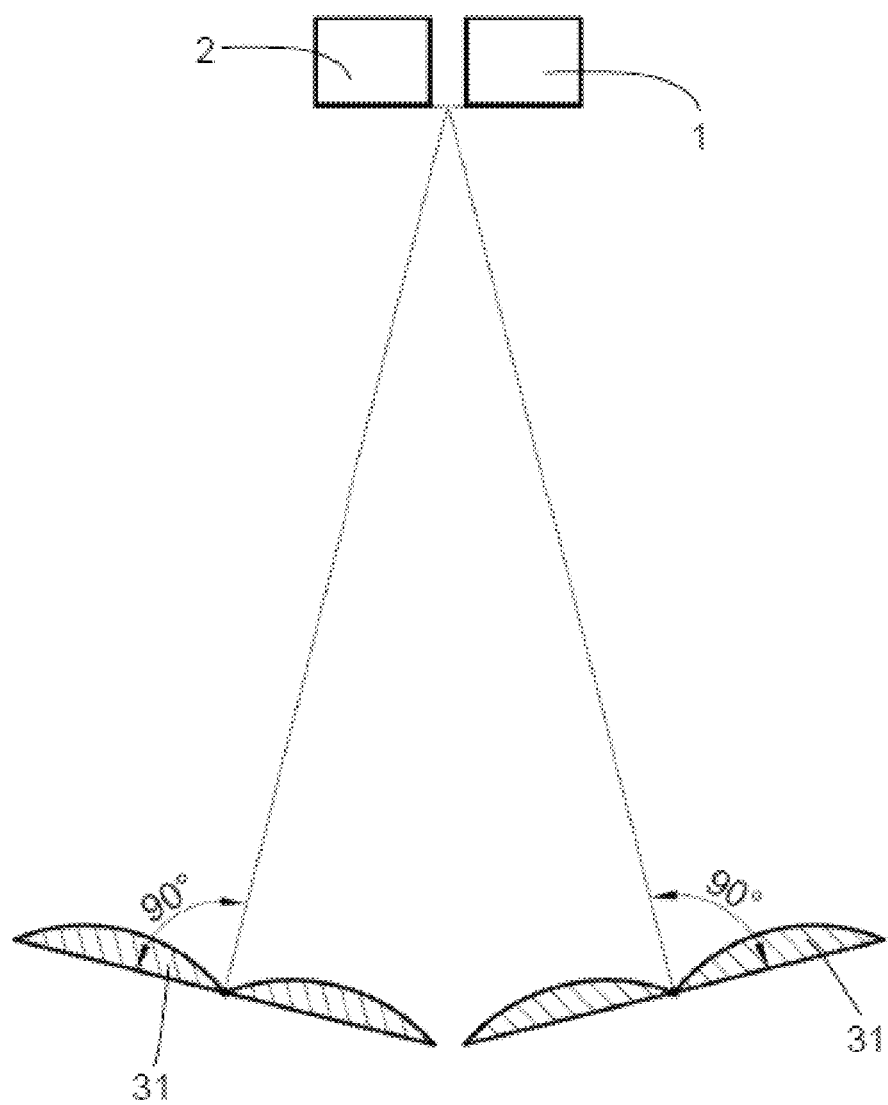
FIG. 12, a schematic top plan view of a third embodiment of a device according to the invention.

FIG. 12 shows another preferred embodiment of the invention. In this case, the two mannequin planes 30 are arranged in such a way that their perpendicular directions passing through their respective longitudinal symmetry axis 34 intersect at the midpoint between the vertices of pyramid 14 and the second pyramid.

The invention claimed is:

1. A device for laser treatment of trousers comprising:
   a laser beam generating equipment, wherein the laser beam generating equipment defines an emission axis, a first opening angle around said emission axis and a second opening angle around said emission axis, in a plane perpendicular to said first opening angle, such that the laser beam generating equipment is suitable for emitting a laser beam within a first pyramid defined by said emission axis and said first and second opening angles, and
   a work station with two mannequins, wherein each mannequin comprises an upper support structure and two respective mannequin legs extending from the upper support structure,
   wherein the upper support structure comprises a fixing area for an upper part of a pair of trousers having respective trouser legs, wherein the mannequin legs are suitable for being housed inside the trouser legs of the pair of trousers,
   wherein each mannequin leg defines a longitudinal axis, the two longitudinal axes of the two mannequin legs of each mannequin define a mannequin plane, each mannequin defines a longitudinal symmetry axis arranged on said mannequin plane, each one of the mannequins is oriented towards the laser beam generating equipment so that the emission axis strikes the mannequin plane of each mannequin at an angle of less than 90° and each mannequin has at least one of the two respective mannequin legs within the first pyramid,
   wherein the laser beam generating equipment comprises a laser beam generating unit and a head which, while as a whole said head being fixed with respect to the laser beam generating unit so that the head is not suitable for directing the first pyramid from one mannequin of the two mannequins to the other mannequin of the two mannequins, is suitable for directing the laser beam from one mannequin of the two mannequins to the other mannequin of the two mannequins and in any direction comprised within said first pyramid.

2. The device according to claim 1, wherein the two mannequin legs of the two mannequins are within said first pyramid.

3. The device according to claim 1, wherein said emission axis strikes the mannequin plane of each one of said mannequins at an angle between 65° and 85°.

4. The device according to claim 1, further comprising:
   a second laser beam generating equipment, wherein said second laser beam generating equipment defines a second emission axis, a third opening angle around said second emission axis and a fourth opening angle around said second emission axis, in a plane perpendicular to said third opening angle, such that said second laser beam generating equipment is suitable for emitting a second laser beam within a second pyramid defined by said second emission axis and said third and fourth opening angles,
   wherein each mannequin is oriented towards said second laser beam generating equipment so that the second emission axis strikes the mannequin plane of each mannequin at an angle of less than 90°, and each mannequin has at least one of the two respective mannequin legs within said second pyramid, so that each mannequin leg of each mannequin is within at least one of the first pyramid and the second pyramid,
   wherein the second laser beam generating equipment comprises a corresponding laser beam generating unit and a corresponding head which, while as a whole being fixed with respect to the laser beam generating unit of the second laser beam generating equipment so that the corresponding head is not suitable for directing the second pyramid from one mannequin of the two mannequins to the other mannequin of the two mannequins, is suitable for directing said second laser beam from one mannequin of the two mannequins to the other mannequin of the two mannequins and in any direction comprised within said second pyramid.

5. The device according to claim 4, wherein the two mannequin legs of the two mannequins cause the device to have four mannequin legs, and wherein only three of said four mannequin legs are within each one of the first pyramid and the second pyramid.

6. The device according to claim 4, wherein the mannequin planes of the two mannequins are arranged in such a way that respective perpendicular directions passing through the respective longitudinal symmetry axis of each mannequin intersect at the midpoint between the vertices of the first pyramid and the second pyramid.

7. The device according to claim 4, wherein said second emission axis strikes the mannequin plane of each one of said mannequins at an angle between 65° and 85°.

8. The device according to claim 4, wherein said emission axis and said second emission axis are at the same height.

9. The device according to claim 4, wherein an origin of said emission axis and an origin of said second emission axis are separated from each other by a distance of between 25 mm and 1000 mm.

10. A process for laser treating trousers using the device according to claim 4, each trousers comprising a respective first trouser leg and a respective second trouser leg, wherein each one of said first and second trouser legs of said trousers is treated on one sides by one of said laser beam generating equipment and said second laser beam generating equipment and on another side by the other one of said laser beam generating equipment and said second laser beam generating equipment.

11. The process according to claim 10, further comprising a step in which said laser beam generating equipment treats a front part of the first trouser leg of each trousers and said second laser beam generating equipment treats a front part of the second trouser leg of each trousers, subsequently said trousers are rotated 180° by rotating the respective mannequins that are supporting the trousers 180° about the longitudinal symmetry axis of the respective mannequin and, then, said laser beam generating equipment treats a back part of the second trouser leg of each trousers and said second laser beam generating equipment treats a back part of the first trouser leg of each trousers.

12. The process according to claim 10, further comprising a step in which said laser beam generating equipment treats a back part of the first trouser leg of each trousers and said second laser beam generating equipment treats a back part of the second trouser leg of each trousers, subsequently said trousers are rotated 180° by rotating the respective mannequins that are supporting the trousers about the longitudinal symmetry axis of the respective mannequin and, then, said laser beam generating equipment treats a front part of the second trouser leg of each trousers and said second laser beam generating equipment treats a front part of the first trouser leg of each trousers.

\* \* \* \* \*